United States Patent
Le

(10) Patent No.: US 12,002,128 B2
(45) Date of Patent: Jun. 4, 2024

(54) CONTENT FEEDBACK BASED ON REGION OF VIEW

(71) Applicant: ADVANCED MICRO DEVICES, INC., Santa Clara, CA (US)

(72) Inventor: Roto Le, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/379,362

(22) Filed: Jul. 19, 2021

(65) Prior Publication Data

US 2023/0014520 A1  Jan. 19, 2023

(51) Int. Cl.
| | |
|---|---|
| G06T 11/00 | (2006.01) |
| G06F 3/048 | (2013.01) |
| G06N 20/20 | (2019.01) |
| G06V 10/25 | (2022.01) |
| H04N 5/445 | (2011.01) |
| H04N 21/23 | (2011.01) |

(52) U.S. Cl.
CPC ............ G06T 11/001 (2013.01); G06V 10/25 (2022.01)

(58) Field of Classification Search
CPC .. G06T 15/02; G06T 5/50; G06T 7/90; G06T 7/11; G06T 11/001; G06T 2207/20221; G06T 2207/30201; G06V 40/171; G06F 3/013; G06F 3/048; G06F 3/0481; G06F 18/783; G06F 18/24; G06F 18/214; G06F 18/24143; H04N 5/445; H04N 5/45; H04N 21/236; H04N 21/235; H04N 21/2343; H04N 21/23; H04N 19/46; H04N 21/232; H04N 21/812; H04N 21/2387; H04N 21/2187; H04N 21/2407; G06N 20/20; G06N 30/10; G06N 3/08; G06N 3/04842; G06N 3/045; G06N 10/82; G06N 20/42; G06N 20/46; G06N 30/1983; G06Q 30/0242; G06Q 30/02; G06Q 30/0273; H04H 60/47–48; H04H 60/59; H04H 60/63; H04H 60/66

USPC .......................................................... 345/632

See application file for complete search history.

(56) References Cited

U.S. PATENT DOCUMENTS

| | | | |
|---|---|---|---|
| 8,292,433 B2 * | 10/2012 | Vertegaal | G06F 3/011 |
| | | | 351/209 |
| 9,538,219 B2 | 1/2017 | Sakata et al. | |
| 9,984,388 B2 | 5/2018 | Datta et al. | |
| 10,430,662 B2 * | 10/2019 | Katz | G06Q 30/0273 |
| 10,861,249 B2 * | 12/2020 | Eschricht | G06T 7/70 |
| 11,575,953 B2 * | 2/2023 | Asbun | H04N 21/25891 |
| 2012/0257035 A1 | 10/2012 | Larsen | |
| 2018/0070026 A1 * | 3/2018 | Nussbaum | G06F 3/0481 |
| 2018/0375676 A1 * | 12/2018 | Bader-Natal | G06F 3/0481 |
| 2019/0342616 A1 * | 11/2019 | Domm | G06Q 50/01 |
| 2020/0228359 A1 * | 7/2020 | el Kaliouby | H04L 12/1827 |
| 2021/0076002 A1 * | 3/2021 | Peters | H04N 7/152 |
| 2021/0176429 A1 * | 6/2021 | Peters | G06V 20/41 |

(Continued)

FOREIGN PATENT DOCUMENTS

| | | | | |
|---|---|---|---|---|
| WO | WO2021198550 | * | 11/2020 | G06F 3/013 |

*Primary Examiner* — Wesner Sajous

(57) ABSTRACT

Content feedback based on region of view, including: determining, for a user of a recipient device receiving content from a presenting device, a region of view of the content associated with the user; generating, based on the region of view, a visual overlay; and displaying, by the presenting device, the visual overlay applied to the content.

20 Claims, 7 Drawing Sheets

(56) References Cited

U.S. PATENT DOCUMENTS

| | | | |
|---|---|---|---|
| 2021/0183154 A1* | 6/2021 | Canada | G06T 11/60 |
| 2021/0185276 A1* | 6/2021 | Peters | G06V 20/41 |
| 2021/0201855 A1* | 7/2021 | Kammachi-Sreedhar | G09G 5/377 |
| 2021/0399911 A1* | 12/2021 | Jorasch | H04L 65/403 |
| 2022/0086393 A1* | 3/2022 | Peters | G06V 20/41 |

* cited by examiner

CONTENT FEEDBACK BASED ON REGION OF VIEW

BACKGROUND

During a video conference or remote content presentation, there is a challenge in understanding the attentiveness and interests of audience members. Determining the level of attentiveness or focus of these audience members is crucial in areas such as marketing, customer engagement, and the like.

DETAILED DESCRIPTION

Figure 1:
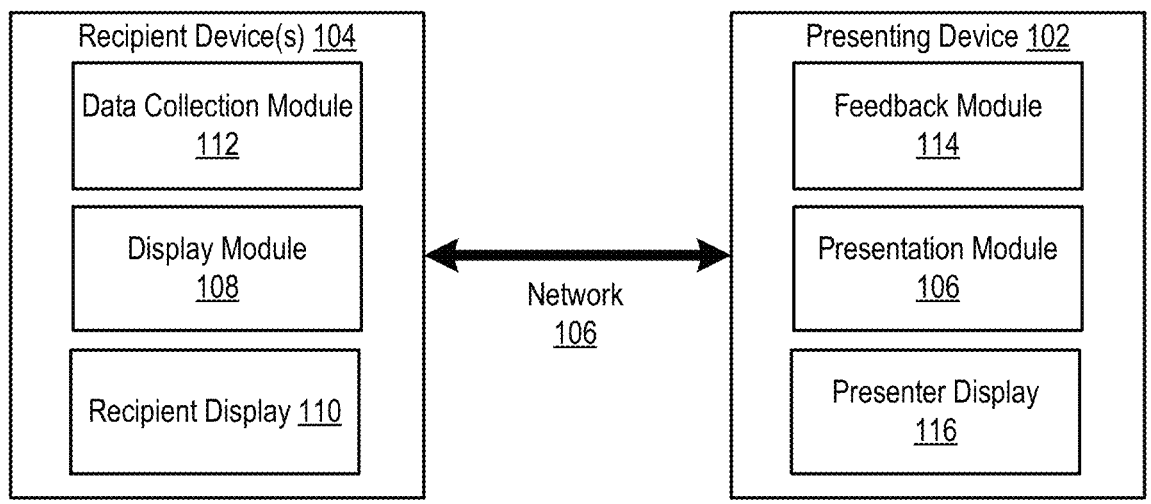
FIG. 1 is a block diagram of an example system for content feedback based on region of view according to some embodiments.

In some embodiments, a method of content feedback based on region of view includes determining, for a user of a recipient device receiving content from a presenting device, a region of view of the content associated with the user; generating, based on the region of view, a visual overlay; and displaying, by the presenting device, the visual overlay applied to the content.

In some embodiments, generating the visual overlay includes generating, based on one or more other regions of view associated with one or more other recipient devices, the visual overlay. In some embodiments, the method further includes generating, based at least on the region of view, a report comprising one or more metrics associated with the content. In some embodiments, generating the visual overlay and displaying the visual overlay are performed during a presentation of the content to the recipient device. In some embodiments, generating the visual overlay and displaying the visual overlay are performed after a presentation of the content to the recipient device. In some embodiments, the visual overlay comprises a heat map. In some embodiments, determining the region of view includes receiving the region of view from the recipient device. In some embodiments, determining the region of view is based on one or more images of the user.

In some embodiments, an apparatus for content feedback based on region of view performs steps including: determining, for a user of a recipient device receiving content from a presenting device, a region of view sample indicating a region of view of the content associated with the user; generating, based on the region of view, a visual overlay; and displaying, by the presenting device, the visual overlay applied to the content.

In some embodiments, generating the visual overlay includes generating, based on one or more other regions of view associated with one or more other recipient devices, the visual overlay. In some embodiments, the steps further include generating, based at least on the region of view, a report comprising one or more metrics associated with the content. In some embodiments, generating the visual overlay and displaying the visual overlay are performed during a presentation of the content to the recipient device. In some embodiments, generating the visual overlay and displaying the visual overlay are performed after a presentation of the content to the recipient device. In some embodiments, the visual overlay comprises a heat map. In some embodiments, determining the region of view includes receiving the region of view from the recipient device. In some embodiments, the region of view is based on one or more images of the user.

In some embodiments, a computer program product disposed upon a non-transitory computer readable medium includes computer program instructions for content feedback based on region of view that, when executed, cause a computer system to perform steps including: determining, for a user of a recipient device receiving content from a presenting device, a region of view of the content associated with the user; generating, based on the region of view, a visual overlay; and displaying, by the presenting device, the visual overlay applied to the content.

In some embodiments, generating the visual overlay includes generating, based on one or more other regions of view associated with one or more other recipient devices, the visual overlay. In some embodiments, the steps further include generating, based at least on the region of view, a report comprising one or more metrics associated with the content. In some embodiments, generating the visual overlay and displaying the visual overlay are performed during a presentation of the content to the recipient device.

During a video conference or remote content presentation, there is a challenge in understanding the attentiveness and interests of audience members. Determining the level of attentiveness or focus of these audience members is crucial in areas such as marketing, customer engagement, and the like. To address these concerns, FIG. 1 is a block diagram of a non-limiting example system. The example system of FIG. 1 includes a presenting device 102 and one or more recipient devices 104. Each of the presenting device 102 and recipient devices 104 can be implemented using a variety of computing devices, including mobile devices, personal computers, peripheral hardware components, gaming devices, set-top boxes, and the like. The presenting device 102 and recipient devices 104 are communicatively coupled by a network 106. The network 106 includes one or more communications paths between the presenting device 102 and the recipient devices 104. In some embodiments, the network 106 also communicatively couples the recipient devices 104. The network 106 is embodied as one or more wired networks, one or more wireless networks, or combinations thereof.

The presenting device 102 includes a presentation module 108 that delivers visual content to the recipient devices 104. In some embodiments, the visual content includes a presentation (e.g., a "slideshow") or other series of images encoded into a video stream for presentation to the recipient devices 104. In some embodiments, the visual content includes video content of a presenter such as a user of the presenting device 102. Accordingly, in some embodiments, the visual content includes video content capturing a user of the presenting device 102 as captured by a camera or other device included in the presenting device 102, such as live video in a video conference or video presentation. In some embodiments, the visual content includes prerecorded or pre-generated video content provided to the recipient devices 104. In some embodiments, the visual content includes a video encoding of user interfaces or other content rendered on the presenting device 102, such as a screen share, desktop mirroring, and the like.

The visual content provided to the recipient devices 104 is rendered by a display module 108 for display on a recipient display 110. For example, the display module 108 decodes, decompresses, decrypts, or otherwise transforms data encoding the visual content and renders video for display on the recipient display 110. As the visual content is being displayed on the recipient display 110, a data collection module 112 determines, for a user of a given recipient device 104, a region of view of the content. A region of view of the content is a portion of rendered visual content that is the focus of a gaze or line of sight of the user. In some embodiments, the region of view corresponds to a point (e.g., one or few pixels of the rendered content). In some embodiments, the region of view corresponds to an area (e.g., a centralized focal point and a surrounding area).

In some embodiments, the data collection module 112 determines the region of view of the content using eye tracking. For example, a camera or other sensor of the recipient devices 104 captures images or video of the user including the user's eye(s). Based on a position of the user in the image or video, as well as a direction that the user's eyes are directed, the data collection module 112 determines a region of view for the user at the time the image or video of the user as captured. Accordingly, the data collection module 112 determines the region of view of the user by generating one or more region of view samplings, where each region of view sampling indicates a particular region of view of a user at a particular point in time. In some embodiments, the region of view samplings are encoded to indicate a particular time in the rendered content at which the region of view sampling is captured, thereby encoding a relationship between a particular region of view of a user at a particular time in the rendered content.

In some embodiments, the data collection module 112 determines the region of view of the content using one or more models (e.g., machine learning models, algorithmic models, and the like). For example, images or video capturing a user of a given recipient device 104 (e.g., generated by a camera or sensor of the recipient device 104) are provided to one or more models that generate, as output, a region of view sampling corresponding to the images or video input to the one or more models. In some embodiments, determining the region of view of the content includes determining that a user is not looking at any portion of the content (e.g., a focus of vision of the user is directed off-screen or to a window or frame not displaying the content).

Each data collection module 112 provides region of view samplings for its corresponding recipient device 104 to a feedback module 114 of the presenting device 102. In other words, the feedback module 114 receives one or more region of view samplings from each of the recipient devices 104 each indicating, for a given user, a particular region of view of the presented content at a particular time. In some embodiments, the feedback module 114 receives the region of view samplings from the recipient devices 104 concurrent to a presentation of the content. In other words, as the content is provided to the recipient devices 104 by the presentation module 108, the data collection modules 112 generate and provide region of view samplings to the feedback module 114. In other embodiments, the feedback module 114 receives the region of view samplings from the recipient devices 104 after a presentation of the content. For example, the data collection module 112 generates region of view samplings and provides an aggregated payload of region of view samplings after a presentation of the content has concluded. In other embodiments, the data collection module 112 provides aggregated payloads of region of view samplings at a predefined interval, where the region of view samplings correspond to a particular time window of content. For example, the data collection module 112 provides aggregations of region of view samplings every five seconds, with each payload including the region of view samplings for a previous five second time window. One skilled in the art will appreciate that other timings are possible for providing the region of view samplings to the feedback module 114.

The feedback module 114 then generates, based on the received region of view samplings, a visual overlay for the content. The visual overlay represents particular regions of view of the content at a particular point in time. In other words, the visual overlay represents, at a given point in time in the content, which regions were viewed by users of recipient devices 104 receiving and presenting the content. In some embodiments, the visual overlay includes a transparent or semitransparent user interface element rendered over the content to indicate degrees to which particular regions of the content are viewed. For example, in some embodiments, the visual overlay includes a heat map. In some embodiments, a particular coloring of the heat map corresponds to a number of users viewing that area of the content, a duration that users view that area of the content, or other metrics for engagement or attentiveness of a user viewing the content. In other words, a color gradient of the heat map at a given area in the rendered content corresponds to a degree to which a region of view of the user is directed to the given area. In some embodiments, the color gradient is based on a time at which a user viewed a given area of the content. For example, a warmer color (e.g., red) corresponds to a current or recent viewing of a given area. The color then transitions to a cooler color (e.g., green) or to an uncolored overlay over time unless a viewer actively views the given area again.

In other embodiments, the visual overlay includes one or more user interface elements highlighting particular areas of interest of the content. For example, the one or more user interface elements highlight one or more most viewed regions of the content at a particular point in time of the content.

The feedback module 114 then displays the visual overlay applied to the content. For example, a presenter display 116 of the presenting device 102 displays both the content and the visual overlay. As a particular portion of the content is being displayed (e.g., the content at a particular time code or point in time), the visual overlay is then based on the regions of view of users of recipient devices 104 at that point in time. Thus, as the content is played back, the visual overlay will dynamically change to represent the changing regions of view of users of the recipient devices 104. One skilled in the art will appreciate that, in some embodiment the content received by recipient devices 104 will mirror the presenter display 116, the content received by recipient devices 104 will exclude any visual overlays. In other words, the visual overlays will only be visible to the users of the presenting device 102.

In some embodiments, generating the visual overlay and displaying the visual overlay is performed concurrent to a presentation of the content. For example, the feedback module 114 receives region of view samplings during a live stream or presentation of the content and generates a visual overlay indicating the current regions of view of users of recipient devices 104. The visual overlay is then displayed over the live content so that a user of the presenting device receives real time feedback of user engagement during the presentation of the content. In other embodiments, generating the visual overlay and displaying the visual overlay is performed after a presentation of the content to the recipient devices 104. For example, the feedback module 114 aggregates region of view samplings during or after a presentation of the content. The feedback module 114 then generates the visual overlay and displays the visual overlay during a replay of the content on the presenting device 102. Thus, a user of the presenting device 102 is provided with a post-presentation analysis of user engagement as indicated by the visual overlay rendered on the replayed content.

In some embodiments, the feedback module 114 generates a report based on the received region of view samplings that includes one or more metrics associated with the content. In some embodiments, the one or more metrics correspond to one or more regions of the content (e.g., predefined subdivisions of the content, such as quadrants). In some embodiments, the one or more metrics correspond to particular visual objects in the content (e.g., particular images, tables, headings, text blocks, and the like). For example, the one or more metrics describe a number of users that viewed a particular area or object, a duration of view (e.g., minimum, maximum, average) for a particular area or object, a most or least viewed area or object, and the like. In some embodiments, the report indicates a degree to which users viewed away from the content. For example, the report indicates an average, minimum, or maximum engagement that a user does not view the content, or does not view a designated portion of the content (e.g., a particular image, table, or otherwise designated element of the content). Thus, the report describes particular metrics relating to the viewing of content by users, allowing for post-presentation analysis of how users engaged with particular portions of the content.

Consider an example where a presenting device 102 is streaming a marketing presentation to one or more recipient devices 104. As the presentation is viewed on the recipient devices 104, the data collection modules 112 generate region of view samples describing the region of view of a given user at a given time during the presentation. The region of view samplings are then provided to the feedback module 114. If the visual overlay is generated and displayed during the presentation, a user of the presenting device 102 will be able to gauge user interest or engagement in real time, allowing the user to modify their presentation strategy should user interest fall (e.g., as indicated by regions of view straying from particular regions of the content). Moreover, a post analysis report will allow the marketer to determine which portions of the content had higher engagement, allowing future presentations to be modified based on the gathered data.

One skilled in the art will appreciate that the arrangement of components in FIG. 1 is merely exemplary, and that other arrangements are also contemplated within the scope of the present disclosure. For example, in some embodiments, the system includes multiple presenting devices 102. Accordingly, in some embodiments, the region of view samplings received by a feedback module 114 of a given presenting device 102 includes region of view samplings for content presented by the given presenting device 102 or all presenting devices 102. Accordingly, the visual overlay for a given presenting device 102 will correspond to content presented by the given presenting device 102 or all presenting devices 102.

As another example, in some embodiments, a given device of the system serves as both a recipient device 104 and a presenting device 102. For example, consider an example where multiple devices are included in a multi-participant video conference, where a given device is designated as a presenting device 102 and other devices as recipient devices 104 depending on which user is speaking, sharing their screen, and the like. Thus, in such an embodiment, one or more of these devices will implement both data collection modules 112 for providing region of view samplings to other devices while serving as a recipient device 104, and feedback modules 114 for receiving region of view samplings and generating visual overlays while operating as a presenting device 102.

One skilled in the art will also appreciate that, in some embodiments, some of the functionality performed by the data collection module 112 recipient device 104 is instead implemented in the presenting device 102. For example, in some embodiments, instead of providing a region of view sampling to a presenting device 102, a recipient device 104 instead provides images or video of a user to the presenting device 102. For example, in a video conference, a continual video feed of each participant is provided to each participating device. The presenting device 102 then determines, based on the received images or video of a given user, the region of view for the user at the time the images or video was captured (e.g., by providing the images or video to one or more models executed on the presenting device 102). This allows the presenting device 102 to generate the visual overlay for the content without the need for additional software tasked with providing region of view samplings to be installed on the recipient devices 104. For example, a presenting device 102 participating in a video conference where recipient devices 104 provide facial video of users to each participant, the presenting device 102 will determine the region of view samplings from the provided facial videos in order to generate the visual overlay.

One skilled in the art will also appreciate that, in some embodiments, the functionality implemented by the data collection module 112, feedback module, or both, is instead implemented in a third party computing device. For example, assume that a third party server device is used to host a video conference or facilitate linking the recipient devices 104 and presenting device 102. In some embodiments, the third party server is configured to generate region of view samplings for given recipient devices 104 by receiving image or video data of the corresponding users and identifying, from the received image or video data, corresponding regions of view. In some embodiments, the generated region of view samplings are provided to presenting devices 102 to allow the presenting device 102 to generate the visual overlay. In other embodiments, the third party server implements a feedback module 114 to generate a visual overlay based on received region of view samplings and provides the visual overlay to a presenting device 102 to display the visual overlay on the content being presented.

Consider another example where multiple devices are participating in a video conference, where a designated device serves as a presenting device 102 (e.g., by virtue of having their screen shared or by virtue of a user speaking into a microphone) while other devices serve as recipient devices 104. During any device's tenure as a presenting device 102, the presenting device 102 will receive region of view samplings from the other recipient devices 104 and is shown, as the visual overlay, live feedback for user engagement. When the presenting device 102 yields to another device, thereby transitioning to a recipient device 104, the newly designated recipient device 104 will provide region of view samplings to the newly designated presenting device 102. Thus, any device serving as a presenting device 102 during the video conference will receive region of view samplings to generate visual overlays accordingly.

Figure 2:
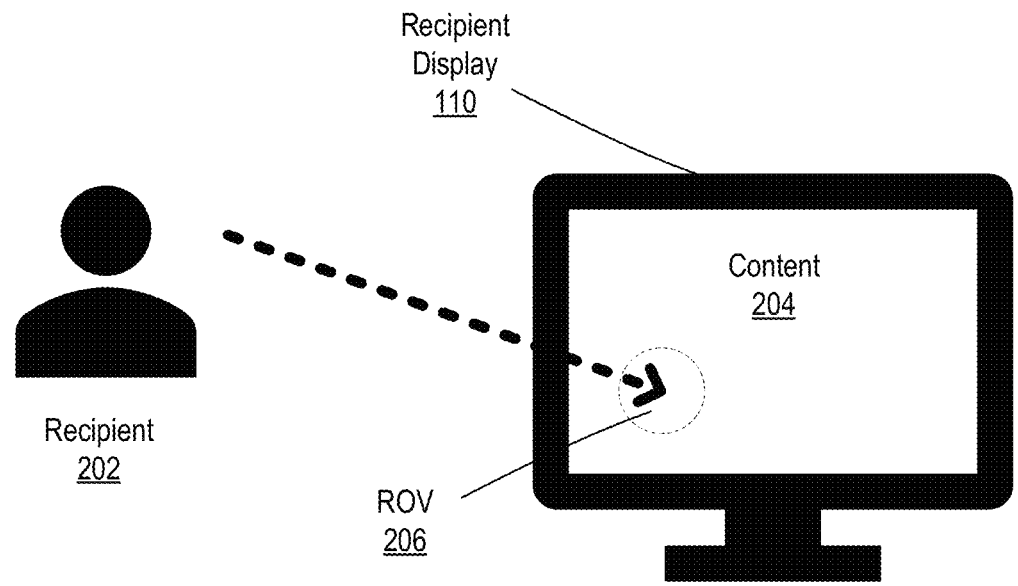
FIG. 2 is a pictorial diagram of a use case for content feedback based on region of view according to some embodiments.
Figure 2:
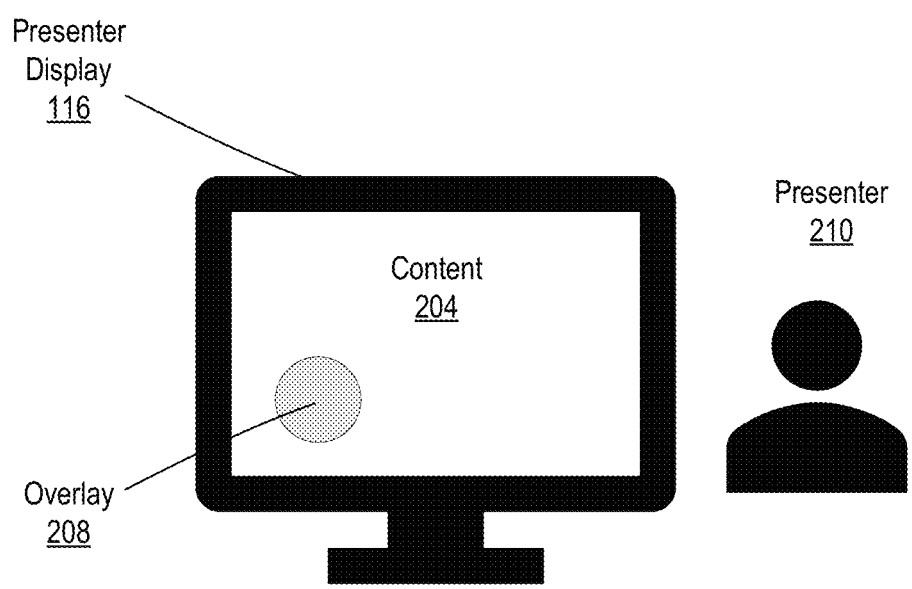

FIG. 2 shows an example pictorial diagram for content feedback based on region of view according to embodiments of the present disclosure. In the example pictorial diagram of FIG. 2, a recipient 202 (e.g., a user of a recipient device 104) is viewing content 204 displayed on a recipient display 110. The content 204 is received from a presenting device 102. The gaze or line of sight of the recipient 202 is directed to a particular portion of the recipient display 110 as indicated by region of view (ROV) 206. Accordingly, the recipient device 104 generates region of view samplings identifying the ROV 206 and identifying when in the content (e.g., time stamps and the like) the recipient 202 was focused on the ROV 206.

The region of view samplings are received by the presenting device 102 and used to generate an overlay 208. The overlay 208 is rendered over the content 204 and displayed by the presenter display 116. Thus, a presenter 210 (e.g., a user of the presenter device 102) views an overlay 208 reflecting the ROV 206 during presentation of the content 204.

Content feedback based on region of view in accordance with the present application is generally implemented with computers, that is, with automated computing machinery. For further explanation, therefore, FIG. 3 sets forth a block diagram of computing machinery including an exemplary computer 300 configured for content feedback based on region of view according to certain embodiments. For example, the presenting device 102 or recipient devices 104 are implemented as a computer 300 of FIG. 3. The computer 300 of FIG. 3 includes at least one computer processor 302 or 'CPU' as well as random access memory (RAM) 304 which is connected through a high speed memory bus 306 and bus adapter 308 to processor 302 and to other components of the computer 300.

Figure 3:
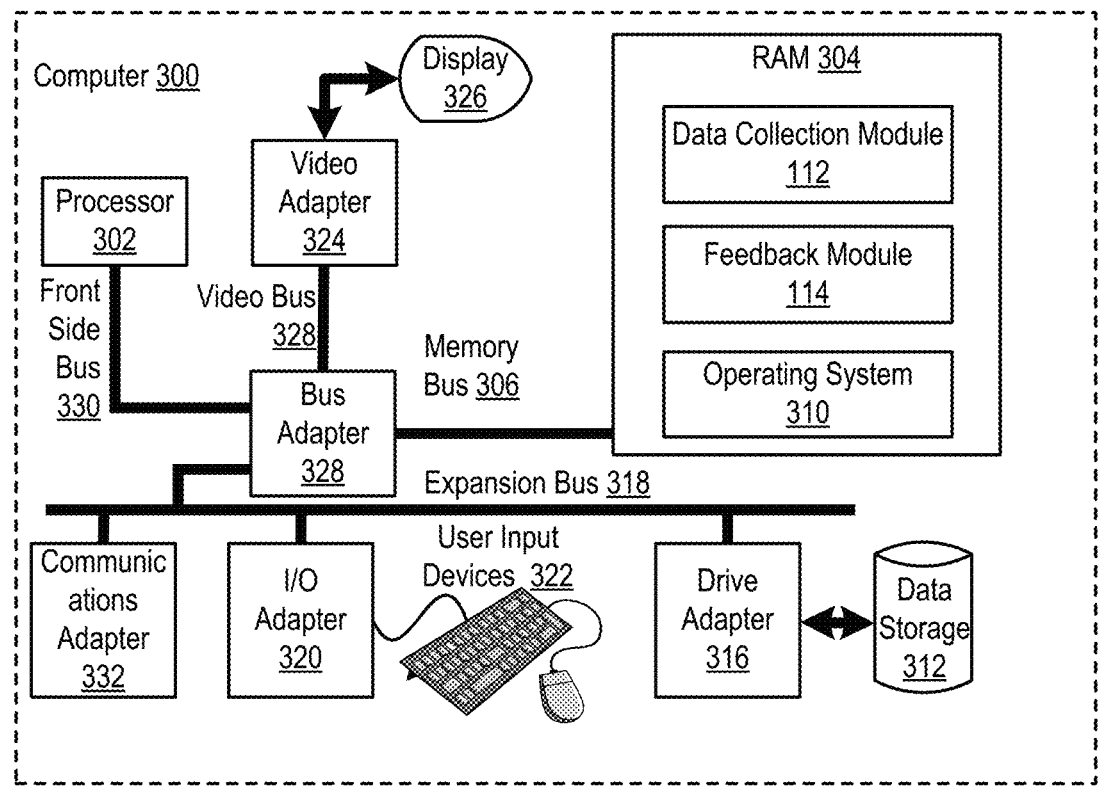
FIG. 3 is a diagram of an example computing device for content feedback based on region of view according to some embodiments.

Stored in RAM 304 is an operating system 310. Operating systems useful in computers configured for content feedback based on region of view according to certain embodiments include UNIX™, Linux™, Microsoft Windows™, and others as will occur to those of skill in the art. The operating system 310 in the example of FIG. 3 is shown in RAM 304, but many components of such software typically are stored in non-volatile memory also, such as, for example, on data storage 312, such as a disk drive. Also stored in RAM is a data collection module 112 or feedback module 114 according to certain embodiments.

The computer 300 of FIG. 3 includes disk drive adapter 316 coupled through expansion bus 318 and bus adapter 308 to processor 302 and other components of the computer 300. Disk drive adapter 316 connects non-volatile data storage to the computer 300 in the form of data storage 312. Disk drive adapters useful in computers configured for content feedback based on region of view according to certain embodiments include Integrated Drive Electronics ('IDE') adapters, Small Computer System Interface ('SCSI') adapters, and others as will occur to those of skill in the art. In some embodiments, non-volatile computer memory is implemented as an optical disk drive, electrically erasable programmable read-only memory (so-called 'EEPROM' or 'Flash' memory), RAM drives, and so on, as will occur to those of skill in the art.

The example computer of FIG. 3 includes one or more input/output ('I/O') adapters 320. I/O adapters implement user-oriented input/output through, for example, software drivers and computer hardware for controlling output to display devices such as computer display screens, as well as user input from user input devices 322 such as keyboards and mice. The example computer 300 of FIG. 3 includes a video adapter 324, which is an example of an I/O adapter specially designed for graphic output to a display device 326 such as a display screen or computer monitor. Video adapter 324 is connected to processor 302 through a high speed video bus 328, bus adapter 308, and the front side bus 330, which is also a high speed bus.

The exemplary computer 300 of FIG. 3 includes a communications adapter 332 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for content feedback based on region of view according to certain embodiments include modems for wired dial-up communications, Ethernet (IEEE 802.3) adapters for wired data communications, and 802.11 adapters for wireless data communications.

Figure 4:
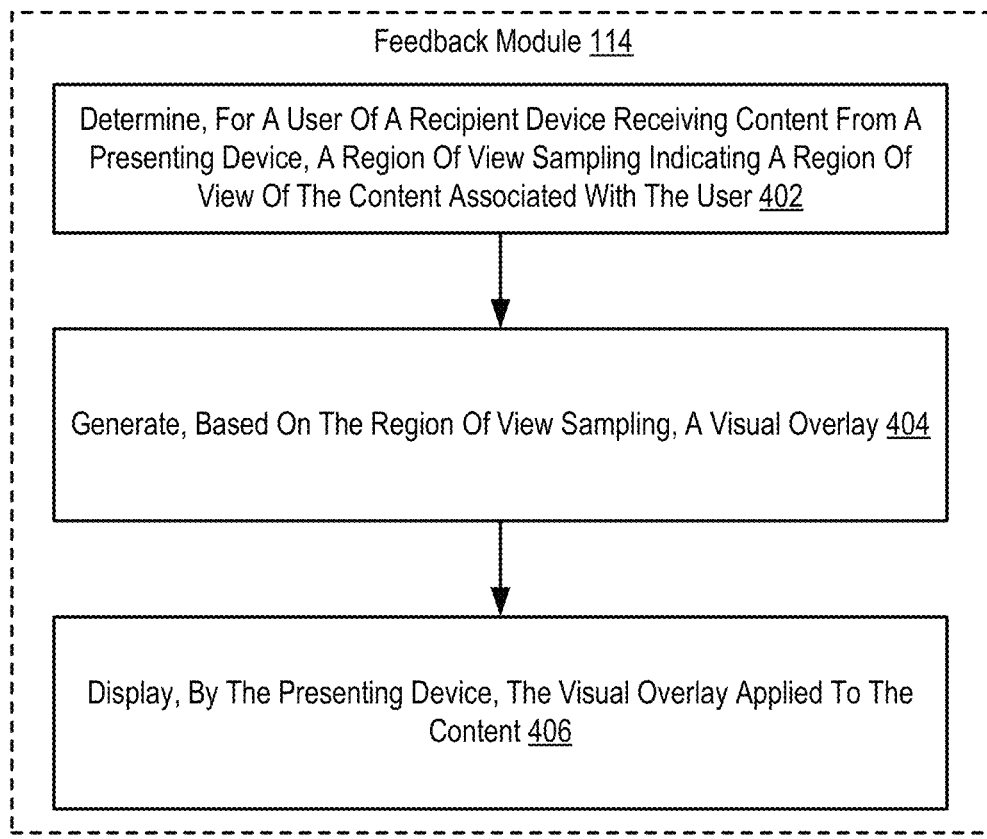
FIG. 4 is a flowchart of an example method for content feedback based on region of view according to some embodiments.

For further explanation, FIG. 4 sets forth a flow chart illustrating an example method for content feedback based on region of view that includes determining 402 (e.g., by a feedback module 114), for a user of a recipient device 104 receiving content from a presenting device 102, a region of view sampling indicating a region of view of the content associated with the user. In some embodiments, the content includes a presentation (e.g., a "slideshow") or other series of images encoded into a video stream for presentation to the recipient devices 104. In some embodiments, the content includes video content of a presenter such as a user of the presenting device 102. Accordingly, in some embodiments, the content includes video content capturing a user of the presenting device 102 as captured by a camera or other device included in the presenting device 102, such as live video in a video conference or video presentation. In some embodiments, the content includes prerecorded or pre-generated video content provided to the recipient devices 104. In some embodiments, the content includes a video encoding of user interfaces or other content rendered on the presenting device 102, such as a screen share, desktop mirroring, and the like.

A region of view of the content is a portion of rendered content that is the focus of a gaze or line of sight of the user. In some embodiments, the region of view corresponds to a point (e.g., one or few pixels of the rendered content). In some embodiments, the region of view corresponds to an area (e.g., a centralized focal point and a surrounding area). In other words, the region of view corresponds to a visual focus of a user viewing the content.

In some embodiments, determining 402 the region of view sampling is based on eye tracking. For example, a camera or other sensor of the recipient devices 104 captures images or video of the user including the user's eye(s). Based on a position of the user in the image or video, as well as a direction that the user's eyes are directed, a region of view for the user at the time the image or video of the user is captured is determined. Accordingly, each region of view sampling indicates a particular region of view of a user at a particular point in time. In some embodiments, the region of view samplings are encoded to indicate a particular time in the rendered content at which the region of view sampling is captured, thereby encoding a relationship between a particular region of view of a user at a particular time in the rendered content.

In some embodiments, determining 402 the region of view sampling includes receiving a generated region of view sampling from a recipient device 104. In other embodiments, determining 402 the region of view sampling includes generating the region of view sampling based on received images or video of the user. For example, a camera or other sensor of a recipient device captures images or video of the user and provides the images or video to a presenting device 102 in order to generate the region of view sampling.

In some embodiments, determining 402 the region of view sampling is based on one or more models (e.g., machine learning models, algorithmic models, and the like). For example, images or video capturing a user of a given recipient device 104 (e.g., generated by a camera or sensor of the recipient device 104) are provided to one or more models (e.g., executed on the recipient device 104, the presenting device 102, or an intermediary device) that generate, as output, a region of view sampling corresponding to the images or video input to the one or more models. In some embodiments, determining the region of view of the content includes determining that a user is not looking at any portion of the content (e.g., a focus of vision of the user is directed off-screen or to a window or frame not displaying the content).

The method of FIG. 4 also includes generating 404 (e.g., by the feedback module 114), based on the region of view sampling, a visual overlay. The visual overlay represents particular regions of view of the content by users at a particular point in time. In other words, the visual overlay represents, at a given point in time in the content, which regions were viewed by users of recipient devices 104 receiving and presenting the content. In some embodiments, the visual overlay includes a transparent or semitransparent user interface element rendered over the content to indicate degrees to which particular regions of the content are viewed. For example, in some embodiments, the visual overlay includes a heat map. In some embodiments, a particular coloring of the heat map corresponds to a number of users viewing that area of the content, a duration that users view that area of the content, or other metrics for engagement or attentiveness of a user viewing the content. In other words, a color gradient of the heat map at a given area in the rendered content corresponds to a degree to which a region of view of the user is directed to the given area. In some embodiments, the color gradient is based on a time at which a user viewed a given area of the content. For example, a warmer color (e.g., red) corresponds to a current or recent viewing of a given area. The color then transitions to a cooler color (e.g., green) or to an uncolored overlay over time unless a viewer actively views the given area again.

In other embodiments, the visual overlay includes one or more user interface elements highlighting particular areas of interest of the content. For example, the one or more user interface elements highlight one or more most viewed regions of the content at a particular point in time of the content.

The method of FIG. 4 also includes displaying 406 (e.g., by the feedback module 114), by the presenting device 102, the visual overlay applied to the content. For example, a presenter display 116 of the presenting device 102 displays both the content and the visual overlay. As a particular portion of the content is being displayed (e.g., the content at a particular time code or point in time), the visual overlay is then based on the regions of view of users of recipient devices 104 at that point in time. Thus, as the content is played back, the visual overlay will dynamically change to represent the changing regions of view of users of the recipient devices 104. One skilled in the art will appreciate that, in some embodiment the content received by recipient devices 104 will mirror the presenter display 116, the content received by recipient devices 104 will exclude any visual overlays. In other words, the visual overlays will only be visible to the users of the presenting device 102.

In some embodiments, generating the visual overlay and displaying the visual overlay is performed concurrent to a presentation of the content. For example, the feedback module 114 receives region of view samplings during a live stream or presentation of the content and generates a visual overlay indicating the current regions of view of users of recipient devices 104. The visual overlay is then displayed over the live content so that a user of the presenting device receives real time feedback of user engagement during the presentation of the content. In other embodiments, generating the visual overlay and displaying the visual overlay is performed after a presentation of the content to the recipient devices 104. For example, the feedback module 114 aggregates region of view samplings during or after a presentation of the content. The feedback module 114 then generates the visual overlay and displays the visual overlay during a replay of the content on the presenting device 102. Thus, a user of the presenting device 102 is provided with a post-presentation analysis of user engagement as indicated by the visual overlay rendered on the replayed content.

Figure 5:
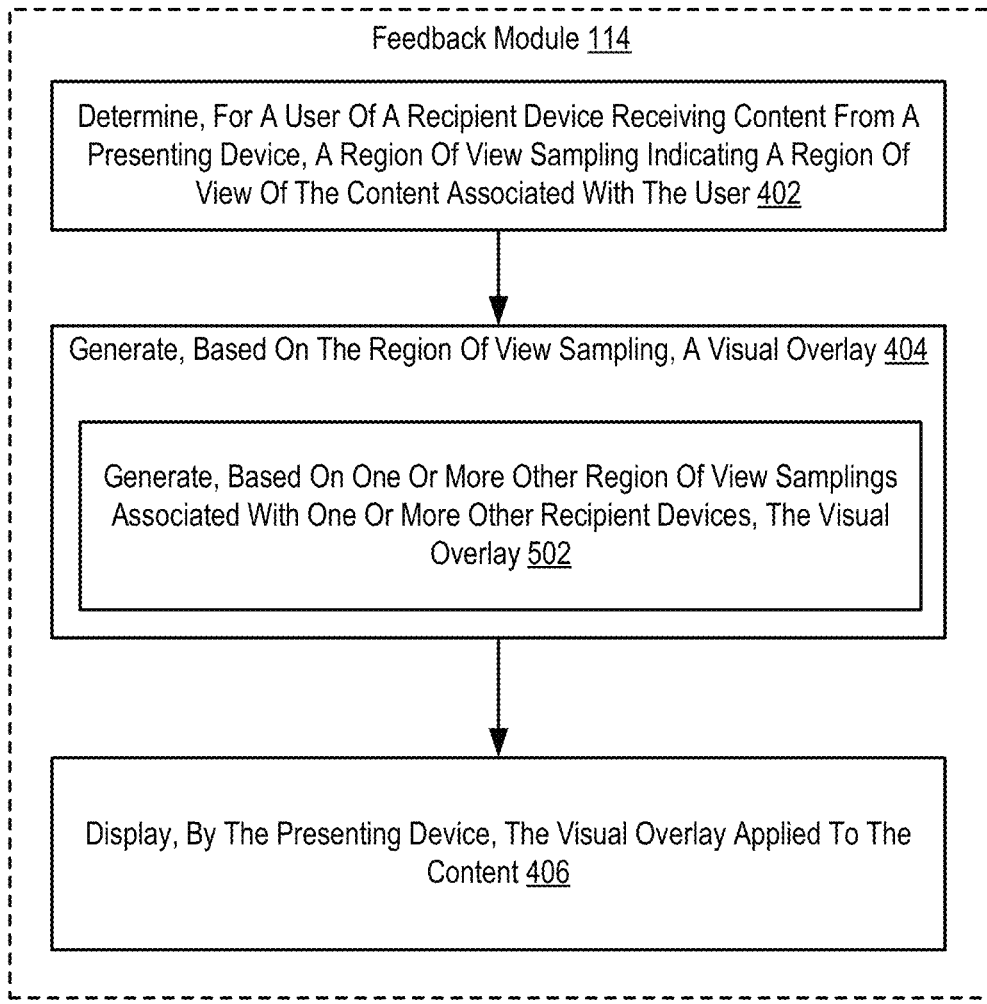
FIG. 5 is a flowchart of another example method for content feedback based on region of view according to some embodiments.

For further explanation, FIG. 5 sets forth a flow chart illustrating another example method for content feedback based on region of view according to embodiments of the present disclosure. The method of FIG. 5 is similar to that of FIG. 4 in that the method of FIG. 5 also includes determining 402, for a user of a recipient device 104 receiving content from a presenting device 102, a region of view sampling indicating a region of view of the content associated with the user; generating 404, based on the region of view sampling, a visual overlay; and displaying 406, by the presenting device 102, the visual overlay applied to the content.

FIG. 5 differs from FIG. 4 in that generating 404, based on the region of view sampling, a visual overlay includes generating 502 (e.g., by the feedback module 114), based on one or more other region of view samplings associated with one or more other recipient devices 104, the visual overlay. For example, assume that the presenting device 102 provides content to multiple recipient devices 104 (e.g., as part of a multi-participant presentation or video conference). Each recipient device 104 provides region of view samplings to the presenting device 102, where each region of view sampling describes a particular region of view of the content at a given point in time by a user of a given recipient device 104. The visual overlay is then based on the region of view samplings from the multiple recipient devices 104. For example, a color gradient of a heat map will change based on a number of users viewing a given portion of the content at a given point in time. As another example, user interface elements will highlight a top-N portions of presented content viewed by users of the recipient devices (e.g., the top 3 portions of content viewed at a given point in time of the content).

Figure 6:
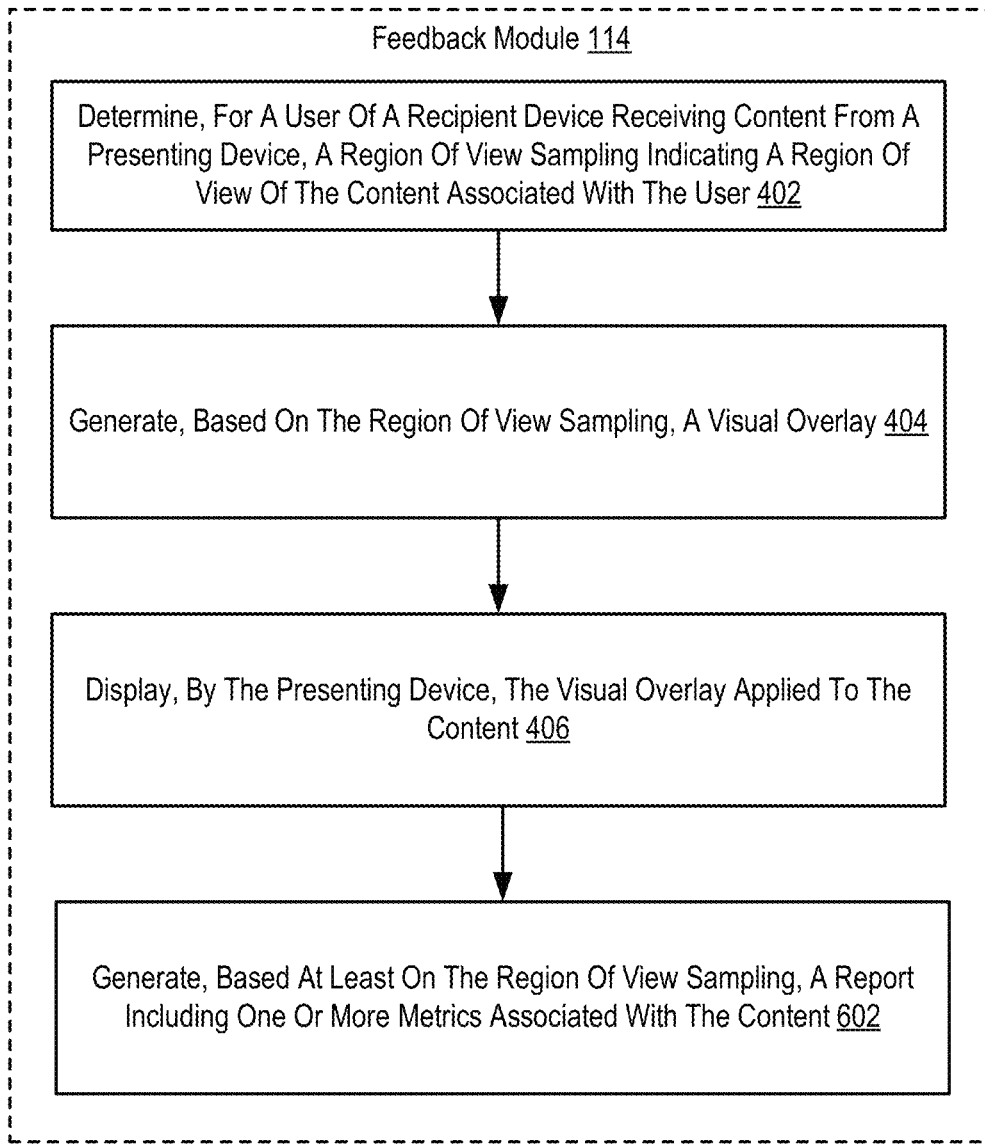
FIG. 6 is a flowchart of another example method for content feedback based on region of view according to some embodiments.

For further explanation, FIG. 6 sets forth a flow chart illustrating another example method for content feedback based on region of view according to embodiments of the present disclosure. The method of FIG. 6 is similar to that of FIG. 4 in that the method of FIG. 6 also includes determining 402, for a user of a recipient device 104 receiving content from a presenting device 102, a region of view sampling indicating a region of view of the content associated with the user; generating 404, based on the region of view sampling, a visual overlay; and displaying 406, by the presenting device 102, the visual overlay applied to the content.

FIG. 6 differs from FIG. 4 in that the method of FIG. 6 further comprises generating 602, based at least on the region of view sampling, a report including one or more metrics associated with the content. In some embodiments, the report is based on multiple region of view samplings from the recipient device 104. In some embodiments, the report is based on multiple region of view samplings from multiple recipient devices 104. In some embodiments, the one or more metrics correspond to one or more regions of the content (e.g., predefined subdivisions of the content, such as quadrants). In some embodiments, the one or more metrics correspond to particular visual objects in the content (e.g., particular images, tables, headings, text blocks, and the like). For example, the one or more metrics describe a number of users that viewed a particular area or object, a duration of view (e.g., minimum, maximum, average) for a particular area or object, a most or least viewed area or object, and the like. In some embodiments, the report indicates a degree to which users viewed away from the content. For example, the report indicates an average, minimum, or maximum engagement that a user does not view the content, or does not view a designated portion of the content (e.g., a particular image, table, or otherwise designated element of the content). Thus, the report describes particular metrics relating to the viewing of content by users, allowing for post-presentation analysis of how users engaged with particular portions of the content.

Figure 7:
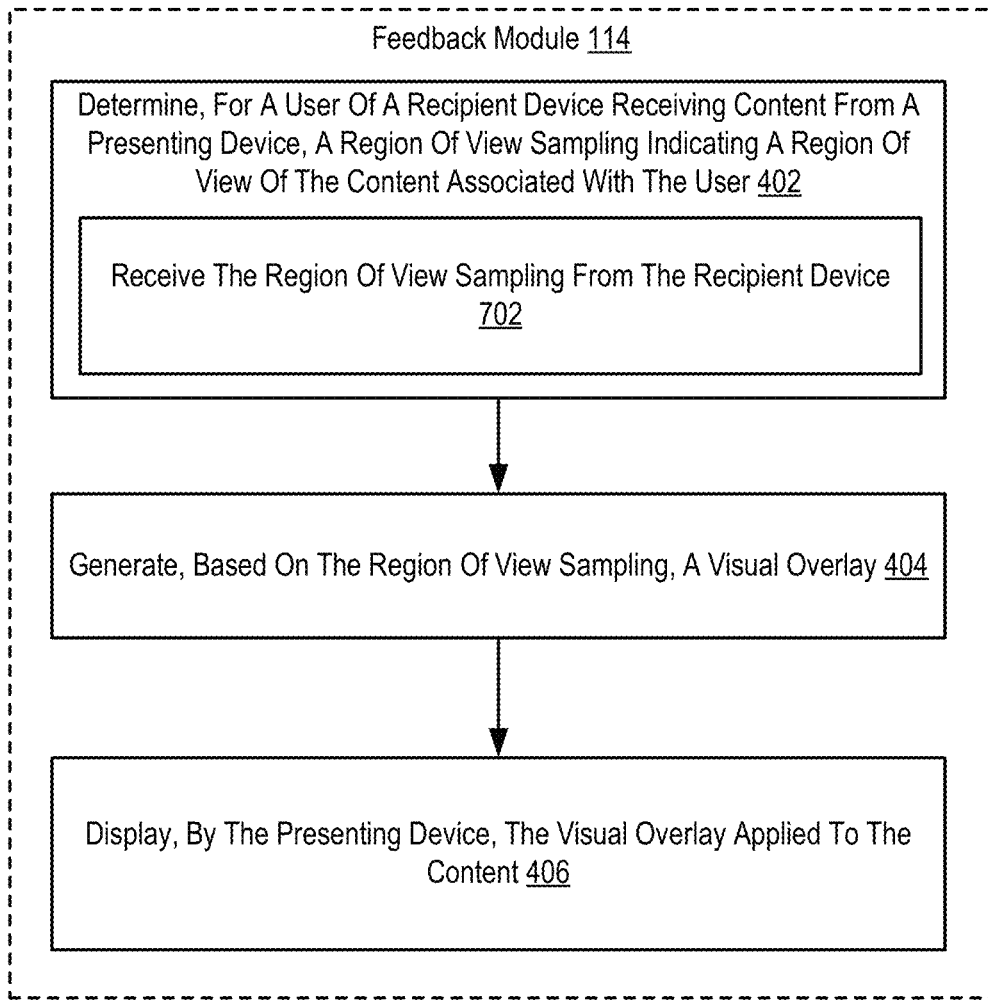
FIG. 7 is a flowchart of another example method for content feedback based on region of view according to some embodiments.

For further explanation, FIG. 7 sets forth a flow chart illustrating another example method for content feedback based on region of view according to embodiments of the present disclosure. The method of FIG. 7 is similar to that of FIG. 4 in that the method of FIG. 7 also includes determining 402, for a user of a recipient device 104 receiving content from a presenting device 102, a region of view sampling indicating a region of view of the content associated with the user; generating 404, based on the region of view sampling, a visual overlay; and displaying 406, by the presenting device 102, the visual overlay applied to the content.

FIG. 7 differs from FIG. 4 in that determining 402, for a user of a recipient device 104 receiving content from a presenting device 102, a region of view sampling indicating a region of view of the content associated with the user includes receiving 702 (e.g., by the feedback module 114) the region of view sampling form the recipient device 104. In some embodiments, the feedback module 114 receives the region of view samplings from the recipient devices 104 concurrent to a presentation of the content. In other words, as the content is provided to the recipient devices 104 by the presentation module 108, the data collection modules 112 generate and provide region of view samplings to the feedback module 114. In other embodiments, the feedback module 114 receives the region of view samplings from the recipient devices 104 after a presentation of the content. For example, the data collection module 112 generates region of view samplings and provides an aggregated payload of region of view samplings after a presentation of the content has concluded. In other embodiments, the data collection module 112 provides aggregated payloads of region of view samplings at a predefined interval, where the region of view samplings correspond to a particular time window of content. For example, the data collection module 112 provides aggregations of region of view samplings every five seconds, with each payload including the region of view samplings for a previous five second time window. One skilled in the art will appreciate that other timings are possible for providing the region of view samplings to the feedback module 114.

In view of the explanations set forth above, readers will recognize that the benefits of content feedback based on region of view include:

Improved performance of a computing system by providing real-time feedback for video content based on the regions of view of users.

Improved performance of a computing system by providing post-presentation analysis of user engagement for video content.

Exemplary embodiments of the present disclosure are described largely in the context of a fully functional computer system for content feedback based on region of view. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of content feedback based on region of view, the method comprising:
    determining, for a recipient device receiving content from a presenting device, a region of view sampling based on one or more models;
    calculating, based on the region of view sampling, a region of view of the content associated with the recipient device;
    generating, based on the calculated region of view, a visual overlay; and
    displaying, at the presenting device, the visual overlay applied to the content.

2. The method of claim 1, wherein generating the visual overlay comprises generating, based on one or more other regions of view associated with one or more other recipient devices, the visual overlay.

3. The method of claim 1, further comprising generating, based at least on the calculated region of view, a report comprising one or more metrics associated with the content.

4. The method of claim 1, wherein generating the visual overlay and displaying the visual overlay are performed during a presentation of the content to the recipient device.

5. The method of claim 1, wherein generating the visual overlay and displaying the visual overlay are performed after a presentation of the content to the recipient device.

6. The method of claim 1, wherein the visual overlay comprises a heat map.

7. The method of claim 1, wherein calculating the region of view comprises receiving the region of view from the recipient device.

8. The method of claim 1, wherein the region of view is based on one or more images of a user of the recipient device.

9. An apparatus for content feedback based on a region of view, the apparatus comprising:
a computer processor; and
memory, the memory storing computer program instructions executed by the computer processor to:
provide content to one or more recipient devices;
determine, for a recipient device receiving content from a presenting device, a region of view sampling based on one or more models;
calculate, based on the region of view sampling, a region of view of the content associated with the recipient device;
generate, based on the region of view, a visual overlay; and
display, at the presenting device, the visual overlay applied to the content.

10. The apparatus of claim 9, wherein generating the visual overlay comprises generating, based on one or more other regions of view associated with one or more other recipient devices, the visual overlay.

11. The apparatus of claim 9, further comprising computer program instructions executed by the computer processor to generate, based at least on the region of view, a report comprising one or more metrics associated with the content.

12. The apparatus of claim 9, wherein generating the visual overlay and displaying the visual overlay are performed during a presentation of the content to the recipient device.

13. The apparatus of claim 9, wherein generating the visual overlay and displaying the visual overlay are performed after a presentation of the content to the recipient device.

14. The apparatus of claim 9, wherein the visual overlay comprises a heat map.

15. The apparatus of claim 9, further comprising computer program instructions executed by the computer processor to:
receive, from the recipient device, data indicating the region of view, wherein the visual overlay is generated based on the received data.

16. The apparatus of claim 15, further comprising computer program instructions executed by the computer processor to:
receive, from the recipient device, one or more images of a user of the recipient device; and
generate, based on the one or more images of the user, the region of view.

17. An apparatus for content feedback based on region of view, the apparatus comprising:
a computer processor; and
memory, the memory storing computer program instructions executed by the computer processor to:
receive content from a presenting device;
determine, for a recipient device, a region of view sampling based on one or more models;
calculate, based on the region of view sampling, a region of view of the content associated with the recipient device;
generate data indicating the region of view of the content, the data facilitating generating a visual overlay for the content by the presenting device; and
provide the data to the presenting device.

18. The apparatus of claim 17, wherein the data indicating the region of view comprises one or more images of a user.

19. The apparatus of claim 17, wherein the visual overlay comprises a heat map.

20. The apparatus of claim 17, further comprising computer program instructions executed by the computer processor to:
calculate, based on one or more images of a user, the region of view of the content; and
identify, in the data, the calculated region of view.

* * * * *